United States Patent
Tabata

(10) Patent No.: US 7,338,129 B2
(45) Date of Patent: Mar. 4, 2008

(54) FOAMED PRODUCT INTEGRAL WITH TRIM COVER ASSEMBLY AND FRAME ELEMENT

(75) Inventor: Tsuyoshi Tabata, Akishima (JP)

(73) Assignee: Tachi-S Co., Ltd., Tokyo (JP)

( * ) Notice: Subject to any disclaimer, the term of this patent is extended or adjusted under 35 U.S.C. 154(b) by 0 days.

(21) Appl. No.: 11/603,907

(22) Filed: Nov. 24, 2006

(65) Prior Publication Data

US 2007/0176479 A1   Aug. 2, 2007

(51) Int. Cl.
*A47C 7/36* (2006.01)
(52) U.S. Cl. .................. 297/391; 264/46.6
(58) Field of Classification Search .......... 297/391; 264/46.6, 46.7
See application file for complete search history.

(56) References Cited

U.S. PATENT DOCUMENTS

| | | | | |
|---|---|---|---|---|
| 4,858,994 A | * | 8/1989 | Yamashita | 297/391 |
| 5,478,136 A | * | 12/1995 | Takeuchi et al. | 297/391 |
| 5,611,977 A | * | 3/1997 | Takei | 264/46.5 |
| 5,681,088 A | * | 10/1997 | Takei | 297/408 |
| 5,855,831 A | * | 1/1999 | Takei | 264/46.6 |
| 6,527,344 B2 | * | 3/2003 | Takei | 297/391 |

FOREIGN PATENT DOCUMENTS

| | | | | |
|---|---|---|---|---|
| JP | 358012735 A | * | 1/1983 | |
| JP | 535052 | | 5/1987 | |
| JP | 409254165 A | * | 9/1997 | |

* cited by examiner

*Primary Examiner*—Joe Edell
(74) *Attorney, Agent, or Firm*—Browdy and Neimark, PLLC

(57) ABSTRACT

A foamed product integral with trim cover assembly, of the type having a frame element provide therein, with two local portions of the frame element projecting outwardly therefrom. The trim cover assembly used has two extensions, with an opening defined therebetween. Both two extensions are bent to and juxtaposed on one cover material portion thereof, thereby forming a three-layer portion therein. The three-layer portion is sewn so as to define an unsewed region therein. The unsewed region has two spaced-part through-holes formed therethrough, hence providing two spaced-apart continuous through-hoes. The two local portions of frame element are inserted through the respective two spaced-apart continuous through-holes, so that the unsewed region is stretched horizontally to keep the corresponding portions of the juxtaposed two extensions and cover material portion in close contact with one another.

2 Claims, 3 Drawing Sheets

FOAMED PRODUCT INTEGRAL WITH TRIM COVER ASSEMBLY AND FRAME ELEMENT

BACKGROUND OF THE INVENTION

1. Field of the Invention

The present invention relates to a foamed product integral with trim cover assembly for use in automotive seat, such as a headrest or an armrest, which is formed by subjecting a three-dimensional trim cover assembly to foaming process entailing the steps of injecting a liquid foaming agent into an inside of the trim cover assembly and curing the liquid foaming agent into a foam padding filled in the trim cover assembly in an integral manner. In particular, the invention is directed to a foamed product of this kind which has, provided therein, a frame element including a portion projecting outwardly from the foamed product. A typical example thereof is a headrest of the type having: a frame element provided therein; and a part of the frame element projecting, as a headrest stay (s), outwardly therefrom.

2. Description of Prior Art

As stated above, it should be noted that the term "foamed product integral with trim cover assembly" is a generic term which generically refers to a foam product formed integrally together with a three-dimensional trim cover assembly, which is typically formed through the following known steps of: injecting a liquid foaming agent into the inside of the trim cover assembly preformed in a predetermined shape and placed in a given die means; and then curing the liquid foaming agent into an increased mass of foam material (e.g. foam padding) filled in the trim cover assembly.

Various sorts of the foregoing foamed product integral with trim cover assembly for use in automotive seat have been made available on the market. Among them, known is a foamed product of this kind which is of the structure having a frame element provided therein, with a part of the frame element projecting outwardly from the foamed product.

For example, in the case where a typical headrest having a pair of stays projected therefrom is formed by foaming process, first of all, a substantially inverted-U-shaped frame is preformed, which has a pair of stay portions defined integrally in the respective two rectilinear free end portions thereof, and also, a three-dimensional trim cover assembly is preformed in a predetermined shape of headrest, which has, formed in the bottom wall thereof, a transversely extending elongated opening for allowing ingress of the foregoing frame therethrough into the inside of the trim cover assembly, and a pair of holes for allowing the foregoing pair of stay portions of the frame to pass therethrough, respectively. In that trim cover assembly, such transversely extending elongated opening is defined between two extensions respectively of two cover materials forming the bottom wall of trim cover assembly. More specifically, those two extensions are both of a length substantially equal to an entire width of the bottom wall of trim cover assembly and bent at substantially a right angle in a direction inwardly of the trim cover assembly, thus defining therebetween the foregoing elongated opening which extends transversely of the bottom wall of trim cover assembly.

Then, the frame is inserted and placed via such elongated opening in the inside of the trim cover assembly, while projecting the pair of stay portions of the frame through the respective afore-said pair of holes to the outside of the trim cover assembly, thereby providing a basic headrest unit. This basic headrest unit is placed in a foaming die, and a liquid foaming agent is injected in the inside of trim cover assembly and cured into a mass of foam padding filled in the trim cover assembly in an integral manner, so that a resultant headrest with two stays is produced.

In this sort of foamed product integral with trim cover assembly, it has been a technical concern that, during the foaming process, the liquid foaming agent will be leaked through the elongated holes as well as through the two holes through which the respective two stay portions pass. To prevent such leakage of liquid foaming agent, the Japanese Laid-Open Patent Publication No. 5-35052 teaches the following points: (i) a horizontal covering portion and a folded horizontal covering portion are provided in an opening region corresponding to the afore-said elongated opening in the bottom wall of trim cover assembly, and the folded horizontal covering portion is juxtaposed on and sewn with the horizontal covering portion to prevent leakage of liquid foaming agent through the opening region, and (ii) a tubular sealing material is provided to each of the two stay portions at a point adjoining the afore-said hole through which each stay portion passes, to thereby prevent leakage of liquid foaming agent through that particular hole.

However, even in the foregoing prior art, the trim cover assembly used per se is of an elastically deformable property and formed in a three-dimensionally closed configuration, and the foregoing two covering portions are both formed from the same materials as those of that trim cover assembly. Consequently, when a liquid foaming agent is injected in such trim cover assembly and cured into an increased mass of foam padding filled therein, a whole of the trim cover assembly is swollen outwardly, so that the foregoing two sewn horizontal covering portions are subjected to slight relative movement in a direction opposite to each other as well as to deformation in any angle, thus creating small interstices between the two sewn horizontal covering portions. As a result thereof, the liquid foaming agent is leaked through such small interstices to the outside of the trim cover assembly during foaming process. Further, the formation of the two sewn covering portions and the provision of the tubular sealing material to the stay portions not only require much labors and skill on the worker's side, but also increase costs for assembly of the headrest.

SUMMARY OF THE INVENTION

In view of the above-stated drawbacks, it is a purpose of the present invention to provide an improved foamed product integral with trim cover assembly, of the type having a frame element provided integrally therewith, which is of a simplified structure that insures to prevent the abovementioned leakage of liquid foaming agent through an opening for allowing ingress of the frame element therethrough into an inside of the trim cover assembly.

In order to achieve such purpose, a foamed product integral with trim cover assembly of this sort in the present invention is basically comprised of:

a first extension defined in the first cover portion;
a second extension defined in the second cover potion;
a pair of first through-holes formed in the first extension;
a pair of second through-holes formed in the second extension;
the first and second extension being contacted with other, such that the foregoing opening is defined therebetween, while such pair of first through-holes are in alignment with the respective pair of second through-holes, thereby providing a pair of two-fold continuous through-holes, whereupon one unit of juxtaposed first and second extensions is provided, with the afore-said pair of two-fold continuous through-holes formed therein, said unit of juxtaposed first and second extensions projecting inwardly of the trim cover assembly;

a pair of third through-holes formed in one of the first and second cover portions;

the afore-said one unit of juxtaposed first and second extensions being bent to and juxtaposed upon the afore-said one of said first and second cover portions, with the pair of two-fold through-holes being in aliment with the respective pair of third through-holes, thereby providing:

a three-layer portion composed of said one unit of juxtaposed first and second extensions and said one of said first and second cover portions; and a pair of three-fold continuous through-holes which are respectively defined by the thus-aligned pair of two-fold through-holes and pair of third through-holes, the three-layered portion being situated within the trim cover assembly and at the afore-said one side of the trim cover assembly, wherein the afore-said one unit of juxtaposed first and second extensions has two lateral ends;

a pair of spaced-apart sewn portions formed by sewing in the three-layer portion, such that one of the afore-said pair of spaced-apart sewn portions extends in a direction from one of the two lateral ends of the afore-said one unit of juxtaposed first and second extensions toward a point near to one of the afore-said pair of three-fold continuous through-holes, whereas on the other hand, another of the afore-said pair of spaced-apart sewn portions extends in a direction from another of the two lateral ends of the afore-said one unit of juxtaposed first and second extensions toward a point near to another of the afore-said pair of three-fold continuous through-holes, so that such pair of spaced-apart sewn portions define two corresponding spaced-apart closed regions in the opening, which in turn defines an opening region in between the first and second extensions, the opening region being adapted for allowing ingress therethrough of the frame element as well as the pair of local portions of the frame element into the inside of trim cover assembly; and an unsewed region defined between the afore-said pair of three-fold continuous through-holes as well as between the afore-said pair of spaced-apart sewn portions, so that the opening region lies in said unsewed region, wherein the afore-said pair of local portions of the frame element pass through the respective pair of three-fold continuous through-holes and project outwardly from the trim cover assembly.

Preferably, an injection hole for allowing an injection nozzle to be inserted therethrough into the inside of the trim cover assembly may be formed in the unsewed region so as to penetrate all the three-layer portions.

Other features and advantages of the present invention will become apparent from reading of the description hereinafter, with reference to the annexed drawings.

DETAILED DESCRIPTION OF PREFERRED EMBODIMENTS OF THE PRESENT INVENTION

First of all, it should be understood that the present invention relates to what has been described above as a "foamed product integral with trim cover assembly, of the type having a frame element integrally provided therein", and more specifically, the invention is directed to a "foamed product integral with trim cover assembly, of the type wherein a frame element is integrally provided therein and a local portion of the frame element projects outwardly therefrom". Therefore, the present invention cover any foamed product of this kind, which includes a headrest, an armrest, and so forth, as far as it may fall in the scopes and gist thereof.

Hence, all the illustrative embodiments shown in FIGS. 1 through 8 are not limitative, but they are just exemplary embodiments which merely serve to facilitate the ease of understanding of the inventive nature and significance of the present invention.

Figure 7:
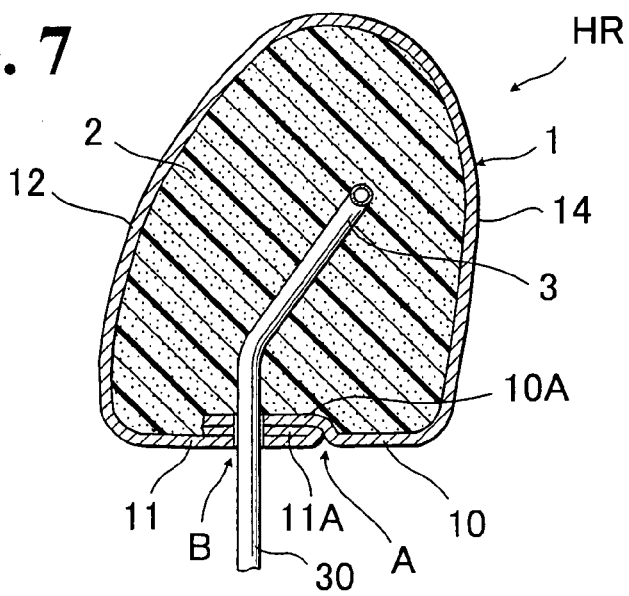
FIG. 7 is a sectional view showing a headrest with two stay portions as one exemplary mode of a foamed product integral with trim cover assembly in accordance with the present invention.

A description will now be made of the instance where the above-defined foamed product is embodied by a headrest with two stays, as generally designated by (HR) in FIG. 7, by way of example.

Figure 2:
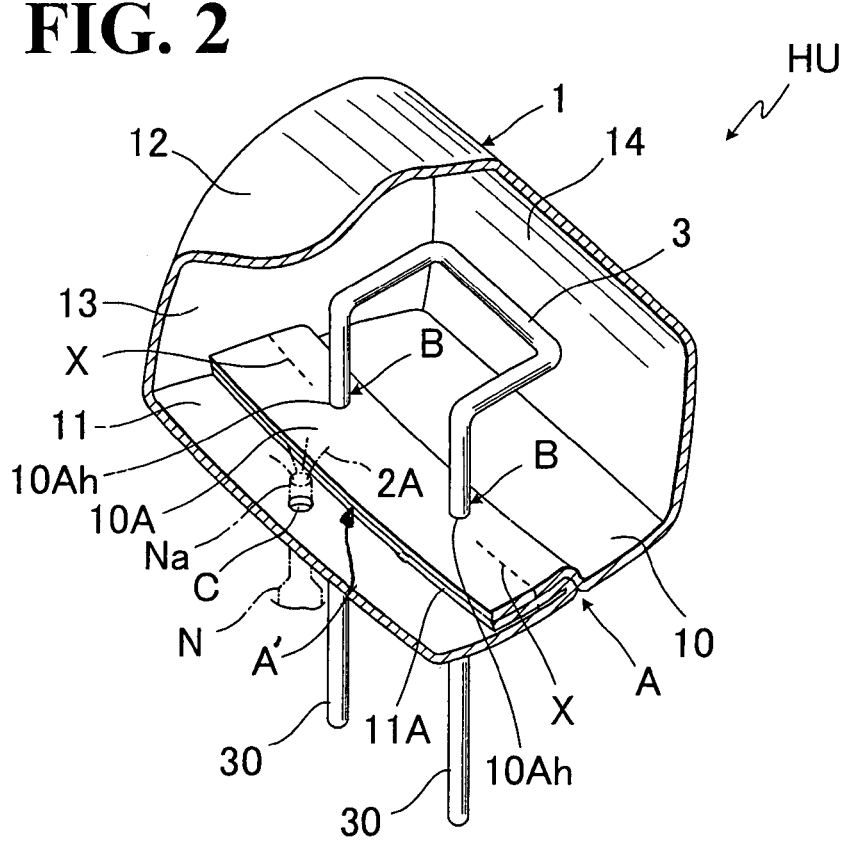
FIG. 2 is a partly broken perspective view of a basic headrest unit used in such one embodiment as in the FIG. 1.

As seen in FIG. 2, in the present embodiment, provided as the foregoing frame element is a generally inverted-U-shaped tubular headrest frame (3) having a pair of tubular stay portions (30) (30) defined integrally in the respective two free end portions thereof. Such two stay portions (30) are spaced apart from each other a given distance.

Figure 1:
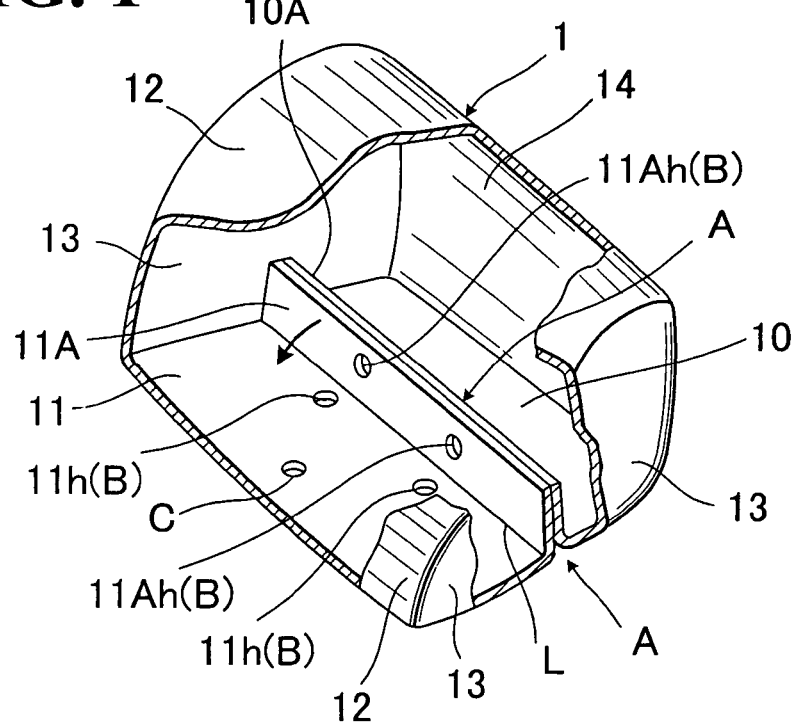
FIG. 1 is a diagram intended to clarify a principal part of trim cover assembly used one embodiment of the present invention to facilitate the ease of understanding thereon.

FIG. 1 is a diagram intended to facilitate the ease of understanding about detailed structure of a three-dimensional trim cover assembly (1) which is preformed in a predetermined shape of headrest body for forming the headrest (HR). But, this is not the actual state of trim cover assembly (1) at initial stage. While not shown, as well known in the art, such sort of three-dimensional trim cover assembly (1) has been formed by sewing together a plurality of separate cover materials, with all reverse surfaces of those cover materials exposed outwardly, to thereby provide a reversed state of trim cover assembly (1) wherein all outer surfaces of the cover materials face inwardly thereof. In the shown embodiment, a plurality of separate cover materials to be initially sewn together in such reversed way are as follows: a frontal cover material (12) corresponding to a frontal surface of the resultant headrest (HR) for receiving a head of user; a backward cover material (14) corresponding to a backward surface of the headrest (HR) opposite to that frontal surface; a pair of lateral cover materials (13) (13); a first bottom cover material (10) having a first extension (10A) formed continuously from a free end thereof; and a second bottom cover material (11) having a second extension (11A) formed continuously from a free end thereof, wherein those first and second bottom cover materials (10) (11) correspond to a bottom side of the headrest (HR).

In this context, in accordance with the present invention, as can be seen from FIGS. 1 and 2, a pair of first through-holes (10Ah) (10Ah) are formed in the first extension (10) so as to be spaced apart from each other a predetermined distance substantially equal to the distance between the afore-said two stay portions (30), whereas on the other hand, formed in the second extension (11) are a pair of second through-holes (11AH) (11Ah) which are spaced apart from each other a distance equal to the said distance between the two first through-holes (10Ah). Thus, in the juxtaposed first and second extensions (10A) (11A), the right-side and left-side first through-holes (10Ah) (10Ah) are in concentric alignment with the right-side and left-side second through-holes (11Ah) (11Ah), respectively, thereby actually providing one pair of two-fold continuous through-holes in those two particular extensions (10A) (11A).

Also, as shown in FIG. 1, a pair of third though-holes (11h) (11h) are formed in the second bottom cover material (11) so as to be spaced apart from each other a distance equal to the foregoing distance between the two second through-holes (11Ah), whereupon the right-side and left-side third through-holes (10Ah) (10Ah) are in concentric relation with the respective right-side and left-side second through-holes (11Ah) (11Ah).

It is noted here that all the foregoing through-holes (10Ah, 11Ah and 11Ah) are equal in diameter to one another, and that a diameter of each of those through-holes is slightly smaller than a diameter of the tubular stay portion (30).

As noted earlier, while not shown, at initial stage, all the aforementioned cover materials (10, 11, 12, 13 and 14) are sewn together, excepting the first and second extensions (10A) (11A), with all the reverse surfaces thereof exposed outwardly, to provide a reversed state of three-dimensional trim cover assembly (1), such that those two extensions (10A) (11A) are contacted with each other and project outwardly therefrom, with a transverse elongated opening (A) being defined therebetween so as to extend transversely of the bottom side of trim cover assembly (1). Then, in that reversed state of trim cover assembly (1), while not actually shown, but, as understandable from the arrow in FIG. 1, the juxtaposed first and second extensions (10A) (11A) are bent relative to a line (L) to and juxtaposed on a reverse side of the second bottom cover material (11), so that all the left-side three through-holes (10Ah, 11Ah and 11h) are aligned with one another to form a three-fold continuous through-hole (B), while all the right-side three through-holes (10Ah, 11Ah and 11h) are aligned with one another to form another three-fold continuous through-hole (B). Thus, it is seen that a three-layer portion (i.e. 10A, 11A and 11) is formed in the bottom wall of trim cover assembly (1), and a pair of three-fold continuous through-holes (B) (B) are formed in that three-layer portion, as understandable from FIGS. 1 and 2.

Designation (C) denotes an injection hole formed in the second bottom cover material (11) distant from a point where both first and second extensions (10A) (11A) are juxtaposed on the second bottom cover material (11) as seen in FIG. 2. The injection hole (C) is adapted for allowing insertion of a tubular end portion (Na) of injection nozzle (N) therethrough for the purpose of injecting a liquid foaming agent into the inside of the trim cover assembly (1), as will be described later.

Figure 5:
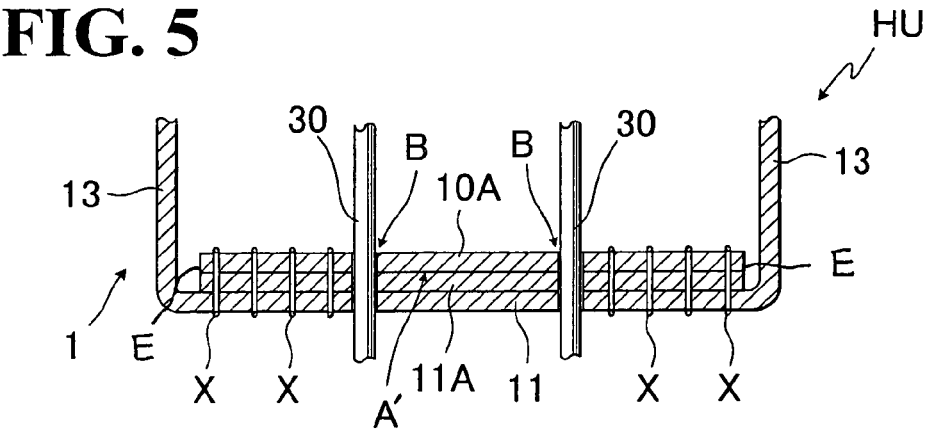
FIG. 5 is a fragmentary sectional view showing a principal part in such one embodiment as in FIG. 3.

Thereafter, as understandable from the two designations (X) (X) in FIG. 2, sewing is effected to connect together two opposite lateral end regions of the three-layer portion (10A, 11A and 11), such that, in each of the two lateral end regions, a thread (X) is sewn in a direction from the lateral edges (at E in FIG. 5) of that three-layer portion toward a point near to the three-fold continuous through-hole (B), as understandable from FIGS. 2 and 5, thereby forming a pair of spaced-apart sewn portions (at X) which close the corresponding two spaced-apart lateral regions of the transverse elongated opening (A), respectively. Accordingly, defined between those two spaced-apart sewn portions (at X) is an unsewed region in the three-layer portion (10A, 11A and 11). Such unsewed region is a predetermined elongated opening region, designated by (A'), which can be resiliently widened enough to allow a whole of the trim cover assembly (1) to be reversed therethrough by drawing an inner side (i.e. an outer surface) of the trim cover assembly (1), as known in the art, and also allow the headrest frame (3) and two stay portions (30) to pass therethrough in the longitudinal direction thereof into the inside of the thus-reversed trim cover assembly (1), as will be stated blow.

Then, while not shown, a part of the inner side of the trim cover assembly (1) is forcibly drawn outwardly through the above-said elongated opening region (A'), thereby turning a whole of the trim cover assembly (1) over relative to that elongated opening (A'), so that the reversed state of trim cover assembly (1) is transformed into a normal state of trim cover assembly (1) wherein all the outer surfaces of the cover materials (10, 11, 12, 13 and 14) thereof are exposed outwardly, while both first and second extensions (10A) (11A) sewn with the second bottom cover material (11) are disposed inside of the trim cover assembly (1), as can be seen in FIG. 2.

Subsequent thereto, the headrest frame (3) with two stay portions (30) is inserted through the elongated opening region (A') in the longitudinal direction thereof into the inside of the trim cover assembly (1), so that an entirety of the headrest frame (3) including the two stay portions (30) is placed in the trim cover assembly (1), after which, those two stay portions (30) are pushed in and through the respective aforementioned pair of three-fold continuous through-holes (B) outwardly so as to project from the bottom side of the trim cover assembly (1), as shown in FIG. 2. Thus, a basic headrest unit (HU) having a pair of stays (30) projected therefrom is provided.

Though not shown, such basic headrest unit (HU) is placed in a suitable foaming die, and, as indicated by the one-dot chain lines in FIG. 2, the tubular end portion (Na) of injection nozzle (N) is inserted in the injection hole (C) of trim cover assembly (1) associated with the basic headrest unit (HU). Then, a liquid foaming agent (2A) is injected via the injection nozzle (N) into the inside of the trim cover assembly (1) and cured into an increased mass of foam padding (2) filled in the trim cover assembly (1) in an integral manner, whereupon, as seen in FIG. 7, is formed a headrest (HR) having the headrest frame (3) provided integrally therein and the two stay portions (30) projecting outwardly from the trim cover assembly (1).

As constructed above, in accordance with the present invention, the following technical effects and advantages are achieved:

(i) In each of the two spaced-apart sewn portions (at X), the three juxtaposed layers (10A, 11A and 11) are in close contact with one another, which effectively prevents leakage of the liquid foaming agent (A2) therethrough.

(ii) As indicated by the arrows in FIG. 5, due to the insertion of two stay portions (30) in the respective two three-fold continuous through-holes (B), the unsewed region (at A') of three-layer portion (10A, 11A and 11) between two spaced-apart sewn portions (at X) are stretched horizontally towards the two stay portions (30) or in leftward and rightward symmetrical directions relative to a center of the trim cover assembly (1), thereby insuring to prevent creation of any slack therein, and also positively keeping all the three layers (10A, 11A and 11) at that particular unsewed region in close contact with one another. Hence, the elongated opening region (A') is completely closed, with no interstice therein, and also, there is no interstice between the second extension (11A) and second bottom cover material (11) in that unsewed region. This simplified tight sealing structure does not require additional sewing and sealing process for closing the elongated opening region (A'), and insures to prevent leakage of the liquid foaming agent (2A) through that elongated opening region (A') during foaming process.

(iii) In addition to the tight juxtaposition of three layers (10A, 11A and 11) as stated in the paragraphs (i) and (ii) above, each of the two three-fold continuous through-holes (B), by the reason that it is formed by the three aligned through-holes (10Ah, 11Ah and 11h), has a large inner circular area, i.e. three times as large as one inner circular area in one through-hole, for contact about the circumferential surface of each tubular stay portion (30). Consequently, as such three-fold continuous through-hole (B) encircles each tubular stay portion (30) in close contact thereabout, there is no interstice and no clearance between the through-hole (B) and the stay portion (30), hence insuring to prevent leakage of the liquid foaming agent (2A) therethrough during foaming process.

Figure 3:
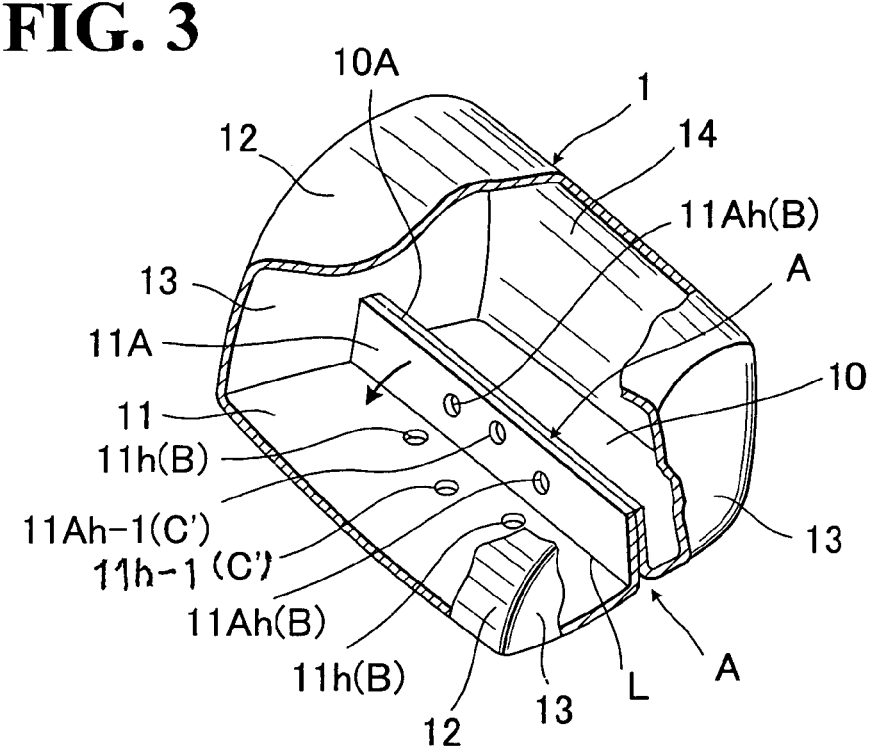
FIG. 3 is a diagram intended to clarify a principal part of trim cover assembly used in another embodiment of the present invention to facilitate the ease of understanding thereon.
Figure 4:
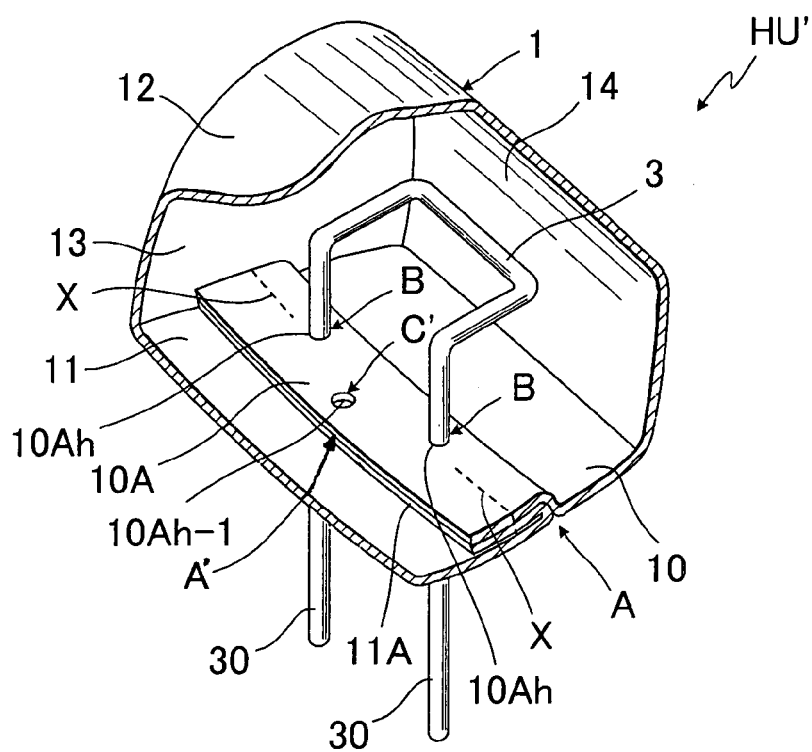
FIG. 4 is a partly broken perspective view of a basic headrest unit used in such another embodiment as in the FIG. 3.
Figure 6:
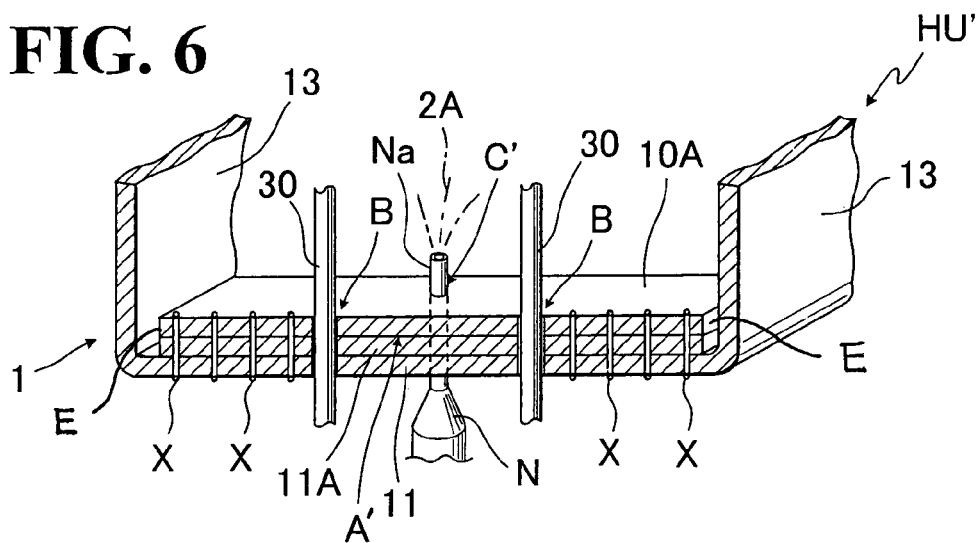
FIG. 6 is a partly broken schematic perspective view, partly in section, which shows a principal part in such another embodiment as in the FIG. 4.

FIGS. 3, 4 and 6 shows another exemplary embodiment which suggests formation of an injection hole (C') in the aforementioned three-layer portion (10A, 11A and 11), instead of the injection hole (C) formed in one layer of the second bottom cover material (11). Of course, the injection hole (C') per se is adapted for allowing insertion of the tubular end portion (Na) of injection nozzle (N) therethrough for the purpose of injecting the liquid foaming agent (2A), likewise as in the previous injection hole (C).

According to this particular embodiment, as understandable from FIGS. 3 and 4, three through-holes (10Ah-1, 11Ah and 11h-1) are required, which are identical in diameter to one another. Preferably, all those through-holes are slightly smaller in diameter than the tubular end portion (Na) of injection nozzle (N) for tight sealing purpose.

It is noted that, excepting such injection hole (C'), the present embodiment is identical to the above-described embodiment in terms of all other constituent elements used and all the processes which entails the specific steps for forming the three-dimensional trim cover assembly (1) as well as the specific steps of forming the three-layer portion (at 10A, 11A and 11), the two spaced-apart sewn regions (at X) and the unsewed region (at A'), and so forth. Therefore, any further description is omitted about the common elements and processes between the present and previous embodiments for the sake of simplicity, and all like designations to be given hereinafter correspond to all like designations that have been used in the above-described embodiment.

As illustrated in FIGS. 3 and 4, a first through-hole (10Ah-1) and a second through-hole (11Ah-1) are formed in the respective first and second extensions (10A) (11A) which are juxtaposed with each other, so that those two through-holes (10Ah-1) (11Ah-1) are in concentric alignment with each other. On the other hand, as seen in FIG. 3, a third through-hole (11h-1) is formed in the second bottom cover material (11) so as to be disposed substantially midway between the previously stated pair of third through-holes (11h) as well as at a point for concentric alignment with the foregoing aligned first and second through-holes (10Ah-1) (11Ah-1).

In the present embodiment as well, while not shown, all the foregoing three through-hoes (10Ah-1, 11Ah-1 and 11h-1) are preformed at the initial stage where the trim cover assembly (1) is in the reversed state as previously described. Hence, it is to be understood that, in that reversed state of trim cover assembly (1), through not shown, but as indicated by the arrow in FIG. 3, the juxtaposed first and second extensions (10A) (11A) are bent relative to a line (L) to and juxtaposed on the second bottom cover material (11), so that the aligned first and second through-holes (10Ah-1) (11Ah-1) defined in those two juxtaposed extensions (10A) (11A) are in turn aligned concentrically with the third through-hole (11h-1). In that way, a three-fold continuous through-hole (C') for allowing insertion therethrough of the injection nozzle tubular end portion (Na) is formed in the bottom wall of trim cover assembly (1). Thereafter, in brief, a basic headrest unit (HU') is formed by placing the headrest frame (3) in the trim cover assembly (1) and projecting the two stay portions (30) through the respective two continuous through-holes (B). In the present alternative embodiment, at the step where such basic headrest unit (HU') is placed in an unshown foaming die, as understandable from FIG. 6, the injection nozzle (N) is inserted through the three-fold continuous through-hole (C') into the inside of the trim cover assembly (1), and then, as indicated by the one-dot chain lines, a liquid foaming agent (2A) is injected from the nozzle (N) in the trim cover assembly (1).

As can be best seen in FIG. 3, it may be arranged such that the first through-hole (10Ah-1) is disposed substantially midway between the previously stated pair of first through-holes (10Ah) so as to be dislocated a given distance from the latter (10Ah) toward the free ends of first and second extensions (10A) (11A), while likewise, the second through-hole (11Ah-1) disposed substantially midway between the previously stated pair of second through-holes (11Ah) so as to be dislocated, a given distance equal to the foregoing given distance, from the latter (11Ah) toward the free ends of first and second extensions (10A) (11A), and also likewise, the third through-hole (11h-1) is disposed substantially midway between the previously stated pair of second through-holes (11h) so as to be dislocated, a given distance equal to the foregoing given distance, from the latter (11h) toward the free ends of first and second extensions (10A) (11A). With this arrangement, insertion of the injection nozzle tubular end portion (Na) through the three-fold continuous through-hole (C') in effect provides an auxiliary stretching effect to the unsewed region (at A') in addition to the previously stated horizontal stretching effect attained by the insertion of two stay portions (30) through the respective two three-fold continuous through-holes (B), so that prevention of slack in the unsewed region (at A') and contact among the three layers (10A, 11A and 11) in that unsewed region are rendered more positive and much stabler, to thereby completely prevent leakage of the liquid foaming agent (2A) through the opening region (A') in a reliable manner.

In the present alternative embodiment, the following effect and advantages are attained:—

(i) Insertion of the injection nozzle tubular end portion (Na) through the continuous through-hole (C') effectively provides an auxiliary stretching effect to the unsewed region (A') in addition to the previously discussed horizontal stretching effect attained by the insertion of two stay portions (30) through the respective two continuous through-holes (B). Thus, the elimination of slack in the unsewed region (at A') as well as the close contact among the three layers (10A, 11A and 11) in that unsewed region, which are attained by the previous embodiment, are made more positive and much stabler, thereby increasing a reliability in preventing leakage of the liquid foaming agent (2A) through the opening region (A').

(ii) The three-fold continuous through-holes (C'), by the reason that it is formed by the three aligned through-holes (10Ah-1, 11Ah-1 and 11h-1), has a large inner circular area, i.e. three times as large as one inner circular area in one through-hole, for contact about the circumferential surface of tubular injection nozzle (30). Consequently, as such three-fold continuous through-hole (C') encircles that tubular end portion (Na) of injection nozzle (N) in close contact thereabout, there is no interstice and no clearance between the through-hole (C') and the injection nozzle tubular end portion (Na), hence insuring to prevent leakage of the liquid foaming agent (2A) therethrough during foaming process.

While having described thus far, it should be understood that the present invention is not limited to the illustrated embodiments, but any other modification, replacement and addition may by applied thereto without departing from the scopes of the appended claims.

What is claimed is:

1. A foamed product integral with trim cover assembly, capable of having a frame element provided therewith, wherein said trim cover assembly is preformed in a predetermined three-dimensional shape including, defined in one side thereof, a first cover portion, a second cover portion, and an elongated opening defined between said first and second cover portions, wherein said frame element has a pair of spaced-apart local portions extending integrally therefrom, wherein said frame element as well as said pair of spaced-apart local portions are inserted through said elongated opening and placed in an inside of said trim cover assembly, such that said pair of spaced-apart local portions projects outwardly from the trim cover assembly, after which, a liquid foaming agent is injected into said inside of said trim cover assembly and cured into an increased mass of foam filled in the trim cover assembly in an integral manner, with said frame element provided integrally therein,
    said foamed product integral with trim cover assembly comprising:
    a first extension defined in said first cover portion;
    a second extension defined in said second cover portion;
    a pair of first through-holes formed in said first extension;
    a pair of second through-holes formed in said second extension;
    said first and second extension being contacted with each other, such that said elongated opening is defined therebetween, while said pair of first through-holes are in alignment with the respective said pair of second through-holes, thereby providing a pair of two-fold continuous through-holes, whereupon one unit of juxtaposed first and second extensions is provided, with said pair of two-fold continuous through-holes formed therein, said unit of juxtaposed first and second extensions projecting inwardly of said trim cover assembly;
    a pair of third through holes formed in one of said first and second cover portions;
    said one unit of juxtaposed first and second extensions being bent relative to and along said elongated opening to said one of said first and second cover portions and juxtaposed thereupon, with said pair of two-fold through-holes being in alignment with the respective said pair of third through-holes, thereby providing:
    a three-layer portion comprised of said one unit of juxtaposed first and second extensions and said one of said first and second cover portions; and
    a pair of three-fold continuous through-holes which are respectively defined by the thus-aligned pair of two-fold through-holes and pair of third through-holes,
    said three-layer portion being thus provided in bent manner within said trim cover assembly and juxtaposed on said one side of the trim cover assembly, whereupon said elongated opening is bent at and extend along said particular one side of the trim cover assembly;
    said one unit of juxtaposed first and second extensions having two lateral ends;
    a pair of spaced-apart sewn portions formed by sewing in said three-layer portion, such that one of said pair of spaced-apart sewn portions extends in a direction from one of said two lateral ends of said one unit of juxtaposed first and second extensions toward a point near to one of said pair of three-fold continuous through-holes, whereas on the other hand, another of said pair of spaced-apart sewn portions extends in a direction from another of said two lateral ends of said one unit of juxtaposed first and second extensions toward a point near to another of said pair of three-fold continuous through-holes, so that said pair of spaced-apart sewn portions define two corresponding spaced-apart closed regions in said elongated opening, which in turn defines an elongated opening region in between said first and second extensions, said elongated opening region being adapted for allowing ingress therethrough of said frame element as well as said pair of local portions of the frame element into the inside of said trim cover assembly;
    an unsewn region defined between said pair of three-fold continuous through-holes as well as between said pair of spaced-apart sewn portions, so that said elongated opening region lies in said unsewn region; and
    said elongated opening region being bent at said one side of the trim cover assembly and extending therealong;
    wherein, at said unsewn region, said one unit of juxtaposed first and second extensions and said one of said first and second cover portions are in close contact with one another due to said pair of spaced-apart sewn portions, thereby causing said elongated opening region to positively close,
    wherein said pair of local portions of said frame element pass through the respective said pair of three-fold continuous through-holes and projecting outwardly from said trim cover assembly, and
    wherein said pair of three-fold continuous through-holes encircle the respective pair of local portions of said frame element in a close contact thereabout.

2. The foamed product integral with trim cover assembly as claimed in claim 1, which further comprises an injection hole for allowing an injection nozzle to be inserted therethrough into the inside of said trim cover assembly, said injection hole being formed in said unsewed region so as to penetrate all said three-layered portions.

* * * * *